Dec. 9, 1969     C. E. HEIN     3,482,667
ONE WAY CLUTCH
Filed Oct. 30, 1967
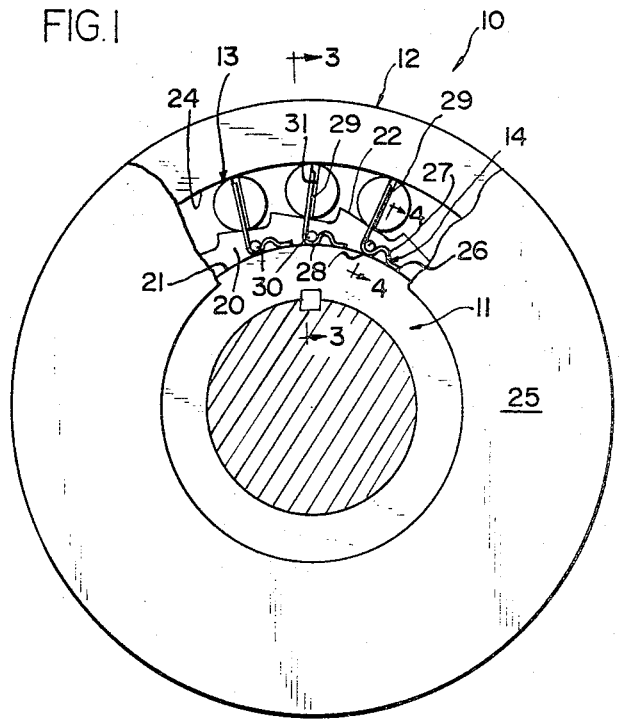
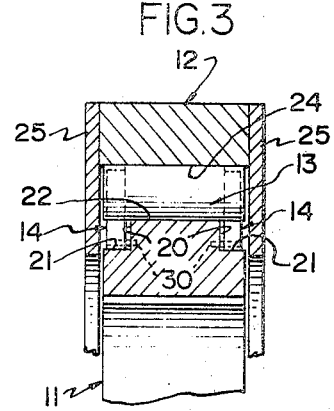
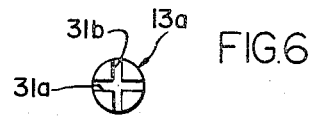
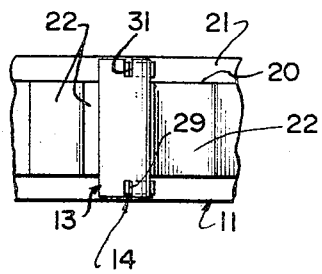
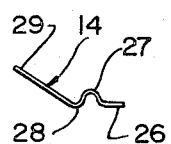
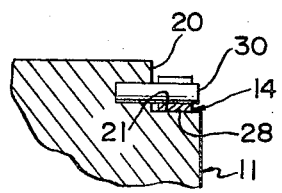
INVENTOR.
CHARLES E. HEIN
BY Evan D. Roberts
ATTORNEY.

United States Patent Office 3,482,667
Patented Dec. 9, 1969

3,482,667
ONE WAY CLUTCH
Charles E. Hein, Newfield, N.Y., assignor, by mesne assignments, to Borg-Warner Corporation, Chicago, Ill., a corporation of Delaware
Filed Oct. 30, 1967, Ser. No. 678,802
Int. Cl. F16d 15/00, 41/06
U.S. Cl. 192—45                                                                    4 Claims

ABSTRACT OF THE DISCLOSURE

A one-way clutch is disclosed herein which is provided with circumferentially spaced cam surfaces on an inner race and which is radially spaced within an outer member race. Roller cams are positioned between the inner race cam surfaces and the outer member race and are retained in this position in engagement with the cam surfaces and the outer race by a resilient means which also prevents full rotation of said cams and substantial movement with respect to the inner race.

SUMMARY OF THE INVENTION

This invention relates to a one-way clutch which is adapted to coaxially interconnect two relatively interconnectible drive elements, and which includes a first inner member having a series of circumferentially spaced cam surfaces, a second member having an inner race radially spaced from the cam surfaces, and cams positioned between the cam surfaces and the outer member race by resilient means whereby the cams are held in frictional engagement with the cam surfaces and the outer member race, as well as against substantial rotation and movement with respect to the cam surfaces whereby a driving relationship is provided between said first and second members through the cams in one urged direction of relative rotation between said first and second members and an overrunning relationship between said second member and said cams in the other urged direction of relative rotation.

The overrunning action is thereby confined between the outer member race and the cams where the lubrication is most efficient due to centrifugal force which will urge the lubricant to this area. Also, the structure of this invention prevents substantial movement between the cams and the cam surfaces to precent unnecessary wear therebetween, particularly in view of the less efficient lubricant tendencies in this radially inward cam area. Also, the cams and resilient means of this invention are adapted to be interconnected in alternative relationships to alternately provide different cam surfaces in wearing engagement to extend the life of the structure.

Other advantages and novel aspects of the invention will become apparent upon the following detailed description in conjunction with the accompanying drawing wherein:

FIG. 1 is a partially sectioned axial view of the illustrative representation of the one-way clutch of this invention showing the radial interposition relationship of the primary elements thereof;

FIG. 2 is a partial side view of the inner race showing a cam positioned on the cam surfaces thereof;

FIG. 3 is a partial sectional view taken line 3—3 of FIG. 1 showing the axial interpositional relationship of the primary elements of the one-way clutch of this invention;

FIG. 4 is an enlarged partial sectional view taken along line 4—4 of FIG. 1 showing the secured position of the resilient member;

FIG. 5 is a view of the resilient member in its normal unsprung form showing the general configuration thereof; and FIG. 6 is an axial end view of a roller cam showing the grooves in the end thereof for providing alternative reception of the resilient means for positioning and retaining the roller.

The one-way clutch 10 illustrated herein (FIG. 1) includes generally, among other things, a first inner member 11, a second outer member 12, cam rollers 13 and resilient means 14. It should be noted that the first member can be either a drive or driven member, and that the second member can similarly be a driven or drive member respectively. The first member is provided with a shoulder 20 and a recess surface 21 on each axial end thereof, and a series of cam surfaces 22 on the periphery thereof.

The second member 12 is provided with an inner annular race surface 24 and the roller cams 13 are respectively provided between the race 24 and the cam surfaces 22. The second member 12 is also provided with radial plates 25 on each side thereof. The cams 13 are held in position by the springs 14. The springs 14 have a base leg portion 26, an arched portion 27, a depressed portion 28 and an extended cam engaging surface 29, and are respectively secured to the recess surface 21 with the leg portion 26 and the depressed portion 28 in engagement with the surface 21 by a pin 30 inserted into the shoulder 20 through the spring depressed portion 28.

Thereby, the depressed, arched and leg portions 28, 27 and 26 of the springs 14 are respectively held by the pin 30 against clockwise rotation and the extended portions 29 of the springs 14 are respectively positioned with the extended portions 29 of the springs 14 in grooves 31 in the ends of the rollers 13. It should be noted that a spring 14 is provided at both ends of each of the rollers 13 to urge the rollers uniformly outwardly along the inclined cam surfaces 22 and into engagement with the race surface 24 of the second member 12.

In the operation of the overrunning clutch 10, as above described, the springs will provide a driving relationship through the rollers 13 when the first member 11 is rotated clockwise inasmuch as in this situation, the rollers 13 will roll on the respective cam surfaces 22 into frictional engagement with the race 24, as a result of the action of the springs 14 on the rollers 13. When the first member 11 is urged counter-clockwise with respect to the second member 12, the rollers 13 will roll radially inwardly and downwardly on the respective cam surfaces 22 against the action of the springs 14 to release the rollers 13 from driving engagement with the race 24 causing the overrunning action between the race 24 and the rollers 13.

It should be noted that in all instances, the roller cams 13 are restricted by the springs 14 against more than a few degrees of rotation about the axis of the cams 13 and that all sliding overrunning relative motion takes place between the second member race 24 and the cam rollers 13.

The cam rollers 13 are provided with a single groove 31 in each end thereof for respectively receiving the extended portion 29 of the springs 14. However, the roller 13a (FIG. 6) is provided with two intersecting grooves 31a and 31b in the ends thereof which provides alternative positionment of the roller 31a with respect to the respective extended spring portion 29. This provides alternative wear surfaces between the roller 13a and the race 25 when the rollers 13a are utilized in the subject invention.

It is to be understood that the invention is not to be limited to the specific constructions and arrangements shown and described, as it will be understood to those skilled in the art that changes may be made without departing from the principles of the invention.

What is claimed is:

1. A one-way clutch adapted to provide a coaxial drive between first and second members comprising a first member having a series of cam incline surfaces extending axially on the periphery thereof, a second member having a circular inner race surface spaced radially outwardly from said first member cam surfaces, cams respectively positioned between said cam incline surfaces of said first member and said inner race of said second member, and spring resilient means secured to said first member and extending radially outwardly therefrom to position said cams for only partial rotation about an axis thereof, said cams being cylindrical roller cams with axially extending radial groove means formed in each end thereof adapted to connectibly receive said radially extended portion of said resilient means, whereby a driving relationship is provided between said first and second members through said cams in one direction of relative rotation urged between said first and second members and an overrunning relationship between said second member and said cams in the other direction of relative rotation.

2. A one-way clutch as defined in claim 1 wherein said cams have the groove means comprising multiple and respectively parallel grooves in opposite ends thereof to provide alternative means for connectively receiving said extended portion of said resilient means.

3. A one-way clutch as defined in claim 2 wherein said roller cams have the alternative grooves on each end thereof positioned at substantially right angles to each other.

4. A one-way clutch as defined in claim 1 wherein said resilient means is secured at one end to a surface of said first member radially inwardly from said cam surfaces.

References Cited

UNITED STATES PATENTS

| 45,248 | 11/1864 | Jochum | 188—82.84 |
|---|---|---|---|
| 643,647 | 2/1900 | Harmon | 192—45 XR |
| 1,692,130 | 11/1928 | Long et al. | 192—45 XR |
| 2,569,108 | 9/1951 | Koch | 192—45 XR |

CARLTON R. CROYLE, Primary Examiner

ALLAN D. HERRMANN, Assistant Examiner

U.S. Cl. X.R.

192—45.1